2 Sheets. Sheet 1.

Mc C. Young Jr.

Harvester Rake.

No. 3978. Reissued. May 17. 1870.

Witnesses
Joel Peyton
Baltis De Long

C. H. McCormick } Assignees of
T. J. McCormick } W. C. Young Jr
by their Attorney
Wm. D. Baldwin 2 Sheets. Sheet. 2.

McC. Young Jr.

Harvester Rake.

No. 3978. Reissued. May 17, 1870.

Witnesses
Joe S. Peyton
Billie DeLong

D. H. McDonnich } Assignees of
Jo. J. McDonnich } McC. Young Jr
by their Attorney
Wm. D. Baldwin

UNITED STATES PATENT OFFICE.

CYRUS H. McCORMICK AND LEANDER J. McCORMICK, OF CHICAGO, ILLINOIS, ASSIGNEES OF McCLINTOCK YOUNG, JR.

IMPROVEMENT IN HARVESTER-RAKES.

Specification forming part of Letters Patent No. 24,598, dated June 28, 1859; reissue No. 3,978, dated May 17, 1870.

*To all whom it may concern:*

Be it known that McCLINTOCK YOUNG, Jr., of the city and county of Frederick, in the State of Maryland, did invent certain new and useful Improvements in Harvesting-Machines, of which the following is a full, clear, and exact description, reference being had to the accompanying drawings, which make part of this specification, and in which—

Figure 1:
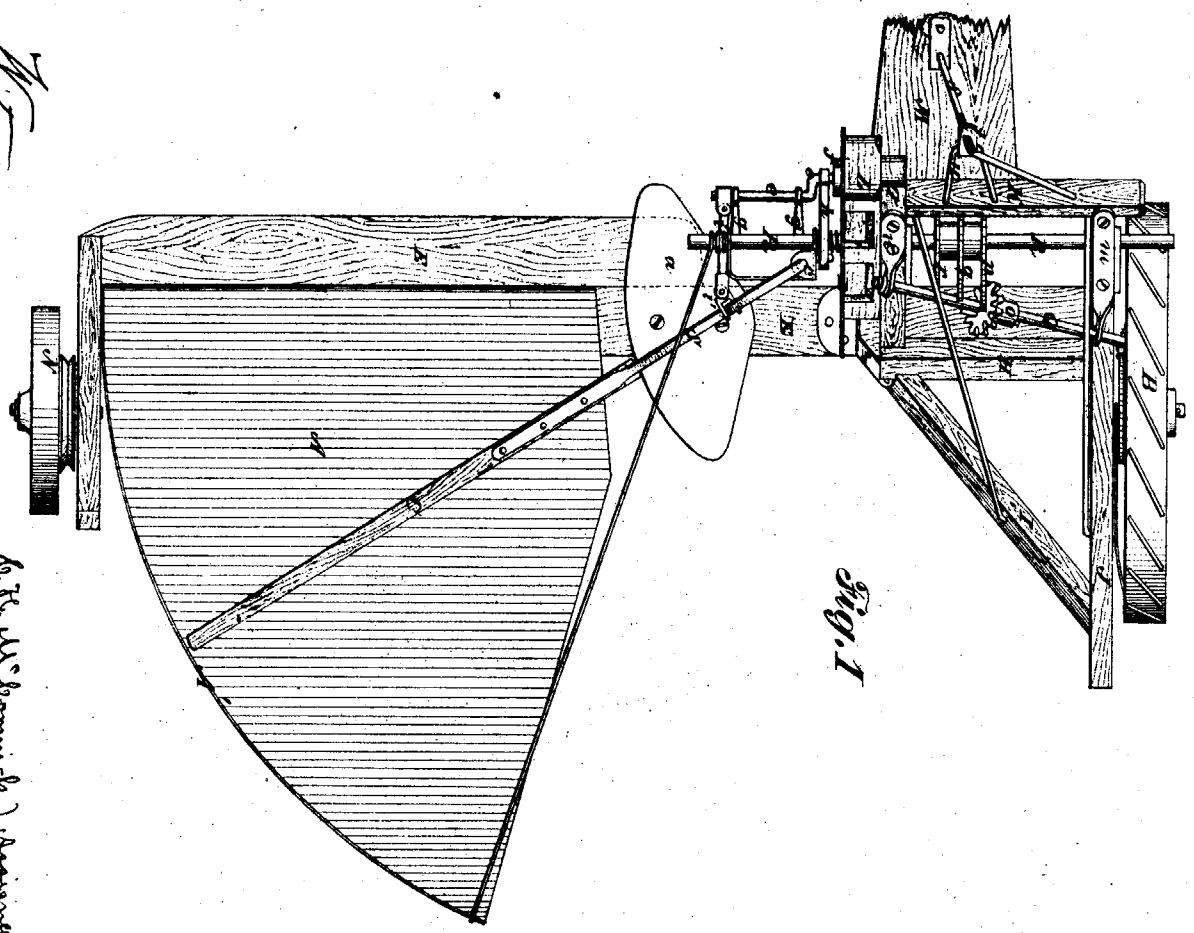
Figure 2:
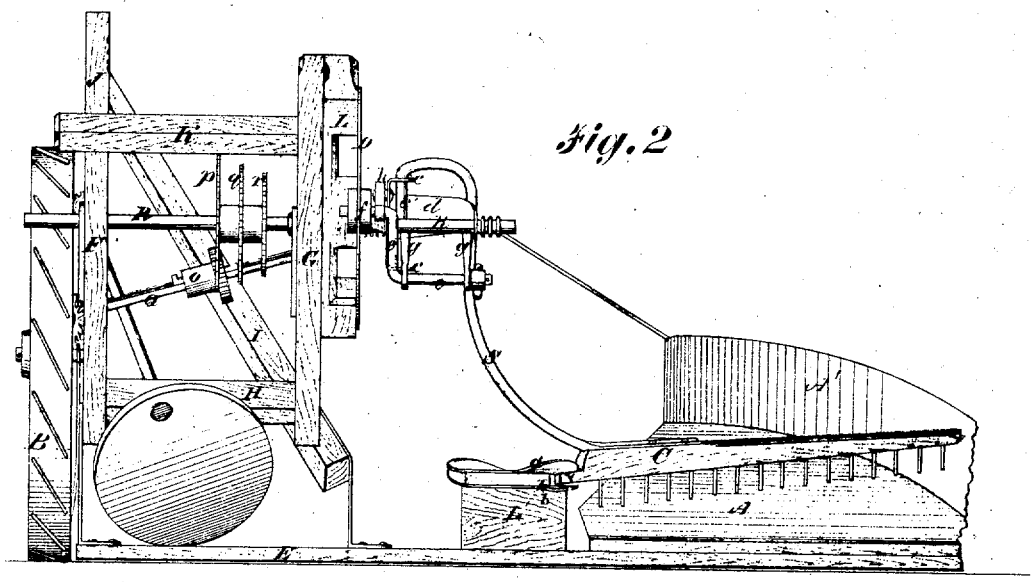

Figure 1 represents a plan or top view of so much of a harvesting-machine embodying my improvements as is necessary to illustrate the invention herein claimed. Fig. 2 represents an elevation of the same as seen from the front; and Fig. 3, an elevation of the same as seen from the divider side thereof, partly in section.

The invention herein claimed relates to that class of radial rakes which co-operate with reel ribs or beaters in gathering the grain to the cutting apparatus, the rake then discharging the cut grain in gavels upon the ground, out of the track of the team when cutting the succeeding swath; and it is the object of the invention to combine with a revolving rake a double-walled cam-guide to control the movements of the rake; also, to combine with a revolving radial rake a guide located upon the platform of the machine, and holding the rake down while it is sweeping the cut grain from the platform.

The invention herein claimed constitutes an improvement upon the self-rake harvester described and represented in Letters Patent of the United States granted to McCLINTOCK YOUNG, Jr., September 21, 1858, and since reissued.

In the accompanying drawings, the frame of the machine (constructed by properly uniting the respective parts E F G H I J K L) is shown as supported by a driving-wheel, B. A perch, M, is connected at its rear end with the frame, while its front end is supported by a leading truck, O, to which the tongue is attached. A screwed spindle, *s*, passes through a nut, *t*, pivoted on a loop, *u*, projecting from the cross-piece K of the frame. By turning the crank-handle of the spindle *s* to the right or left the nut *t* will be screwed up or down on the frame, which is correspondingly tipped on the axle of the driving-wheel, to vary the height of cut and the angle of inclination of the guards. A wheel, N, supports the grain end of the finger-beam and platform A in the usual manner. A fence or guard-board, A′, curved to conform substantially to the path of the rake, and arranged on the outer edge of the platform, prevents the grain from being thrown off by the rake, except at the inner side. A gear, *b′*, on the driving-wheel, drives a corresponding pinion, *q′*, on a shaft, Q, mounted in proper bearings *m n* on the frame. A pinion, *o*, slides freely endwise on the shaft, but is compelled to turn with it by means of a groove and key of well-known construction. This sliding movement enables the pinion *o* successively to gear into any one of a series of gears, *p q r*, on the reel-shaft R, by which means the speed at which the reel and rake move may be varied at the will of the attendant. The reel-shaft R is mounted in proper bearings in the frame-pieces F G.

Suppose the rake C to be in the position shown in the drawings, and in the act of sweeping across the platform A; the handle S of the rake is so shaped that when in the above position it curves upward a short distance above the reel-shaft R, and thence is bent downward, and is received into ears *c*, which project from a supporting-plate, C′, which embraces the reel-shaft, and is braced by a bracket, *d*, which also embraces the reel-shaft, but not so closely as to prevent the supporter C′ from turning freely upon the reel-shaft. Arms *g g*, rigidly secured to and projecting from the reel-shaft, have at their outer ends eyes or boxes, in which the shaft of a crank, *e*, rocks freely. A roller, *f*, on the inner end of this crank *e* fits snugly, but runs freely, in a camway between the parallel surfaces of two cams, D D′, secured upon a block, L, which is mounted upon one of the uprights G of the frame. The wrist of the crank *e* is connected by a pitman, *h*, with the supporting-plate C′, while the outer end of said crank shaft is connected with the handle S of the rake by a swiveling pitman, *i*, and its swivel-joints *i′*, as shown in Figs. 1 and 3.

Figure 3:
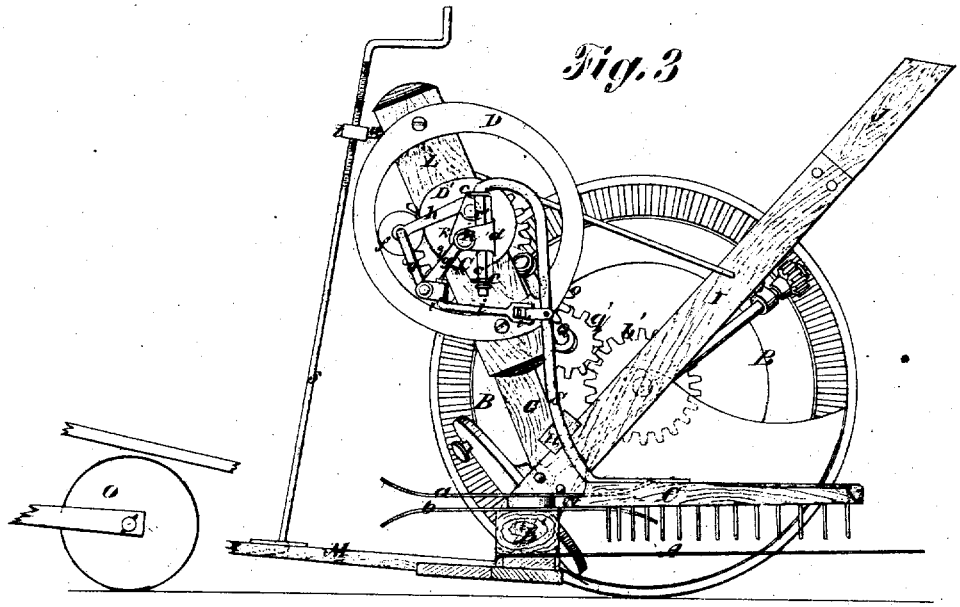

By reference to Fig. 3, it will be seen that the camway is eccentric to the reel-shaft R, and also irregular in shape. It will also be observed that the crank-shaft *e* turns in bearings eccentric to the rake-shaft as well as to the rake-handle. The reel-shaft R, it will be observed, is supported over, or nearly over, the finger-beam, while the rake oscillates on a pivot, *c'*, which is both eccentric and transverse to that shaft; consequently, in revolving around the shaft R, the rake descends into the standing grain in advance of the finger-beam, and nearly parallel therewith, and presses the stalks back against the cutters to be severed, and then sweeps them back upon the platform. After the rake has passed back of the finger-beam and under the axis of the reel the pivot end of the rake-handle (which turns in bearings in the supporter C') assumes a vertical position, as shown in Fig. 3, at which moment the crank-shaft *e* and rake-pivot *c'* are on opposite sides of the reel-shaft, and consequently at the greatest distance apart they can get. The friction-roller is at this moment in the position shown in Fig. 3—that is, in that portion of its camway nearest the center of the reel-shaft R, and as it descends in the camway it is constantly approaching the rake-pivot *c'*. As that portion of the camway which the roller is now traversing constitutes the arc of a circle, the center of which circle is the pivot that connects the link *h* with the supporter C', so long as the roller is in this arc the supporter C' is held firmly by the pressure of the friction-roller against the cam, thus preventing the supporter C' from turning; while the crank-shaft itself continues its revolution, and the rake is pushed around by the pitman *i* in a horizontal circular path, to discharge the gavel. The pushing action of the arms *g g* and pitman *i* upon the central portion of the rake-handle causes the rake to turn upon its pivot *c'*, in the supporting-plate C', until it has passed beyond the inner rear edge of the platform and discharged the gavel therefrom. When the rake has reached this position the pushing action of the pitman *i* still continues and the rake is lifted; but the crank-shaft *e* and rake-pivot *c'* are now on the same side of the shaft and at their point of nearest approximation. As the rake rises to move forward again the friction-roller is caused by the cam to diverge from the reel-shaft. The pitman *h* draws the supporter C' around the reel-shaft more rapidly than that shaft rotates, and thus increases the distance between the rake-pivot *c'* and the crank-shaft *e*. This movement causes the pitman *i* to draw the rake inward in a circle, of which its joint *i'* near the crank-shaft forms the center, and the pitman *i* itself the radius. The rake is thus drawn in nearly parallel to the shaft R, and descends into the standing grain in front of and nearly parallel with the finger-beam. Owing to the operation of the cam the rake moves over the platform more slowly than the reel-shaft rotates; but in rising and moving forward the rake moves more rapidly than the reel-shaft rotates, and thus the rake, although moving at a variable speed, makes the same number of revolutions as the reel-shaft moving at a uniform speed. The guides D D' having parallel surfaces, and the space or camway between them being consequently of uniform width, and the roller *f* fitting snugly while moving freely in this space, it is obvious that the roller *f* on the crank-arm *e*, which controls the rotation of the rake, will be supported firmly in both directions by the bearing of the roller upon the guides.

As before remarked, this is an improvement on a former patent of September 21, 1858, in which similar relative movements were imparted to the rake and reel, but by different mechanism; the double-walled cam, crank-arm, and friction-roller above described producing a more uniform and steadier movement of the rake than that attained in the said former patent.

The curved plates *a b*, which are secured to the offset L' near the inner end of the finger-beam, receive between them the short rounded projection *v* upon the inner end of the rake-head during the time that the rake is passing across the platform, and hold the rake while raking off positively down upon the platform, thus relieving the apparatus connecting the rake-handle and reel-shaft from a portion of the strain to which it would otherwise be subjected.

The reel will sometimes be combined with a shaft independent of and located a short distance in advance of the shaft R, in which case the latter shaft will be made only of a length sufficient to enable it to be combined with the raking apparatus.

What is claimed herein as the invention of said McCLINTOCK YOUNG, Jr., is—

1. The combination of the radial rake revolving around its shaft and oscillating on a pivot both eccentric and transverse to said shaft, the fixed double-walled cam to guide and support the rake, and mechanism connecting the rake and cam, substantially as set forth.

2. The combination of the fixed double-walled cam, the radial rake revolving around its shaft and oscillating on a pivot both eccentric and transverse thereto, and the guide located on the gearing side of the platform, to hold down the rake when discharging the gavel from the platform, substantially as set forth.

McCLINTOCK YOUNG, Jr.
C. H. McCORMICK.
L. J. McCORMICK.

In presence of—
JAMES W. ADAMS,
R. H. McCORMICK.

Witnesses to the signature of L. J. McCORMICK:
C. A. SPRING, Jr.,
W. R. SELLECK.